United States Patent
Takenoshita et al.

[11] 3,892,292
[45] July 1, 1975

[54] HYDRAULIC ELEVATORS

[75] Inventors: Mitsuaki Takenoshita, Katsuta; Fumio Fujisawa, Mito; Ichiro Nakamura, Katsuta, all of Japan

[73] Assignee: Hitachi, Ltd., Japan

[22] Filed: Sept. 12, 1972

[21] Appl. No.: 288,305

[30] Foreign Application Priority Data
Sept. 17, 1971  Japan.............................. 46-71801

[52] U.S. Cl. ..................... 187/17; 187/36; 187/68
[51] Int. Cl. .......................................... B66b 11/04
[58] Field of Search ................. 187/17, 28, 36, 68; 60/428; 91/20, 27

[56] References Cited
UNITED STATES PATENTS
| | | | |
|---|---|---|---|
| 1,234,644 | 7/1917 | Dunn | 187/28 |
| 1,991,000 | 2/1935 | Rogers | 187/28 |
| 2,269,786 | 1/1942 | Rose | 187/17 |

*Primary Examiner*—Evon C. Blunk
*Assistant Examiner*—Joseph E. Valenza
*Attorney, Agent, or Firm*—Craig & Antonelli

[57] ABSTRACT

In a hydraulic elevator of the type comprising a cylinder, a plunger vertically movably received in said cylinder and a cage carried on said plunger, said plunger being moved up or down by pressurized oil supplied into or discharged from said cylinder, means for detecting an upward or downward displacement of the cage occurring incident to unloading or loading of a load when the cage is in its stopping position is provided, so that the pressurized oil may be supplied into the cylinder upon occurrence of downward displacement of the cage and discharged from said cylinder upon occurrence of upward displacement of the cage, whereby the cage is readily brought to a level flush with the floor level.

36 Claims, 18 Drawing Figures

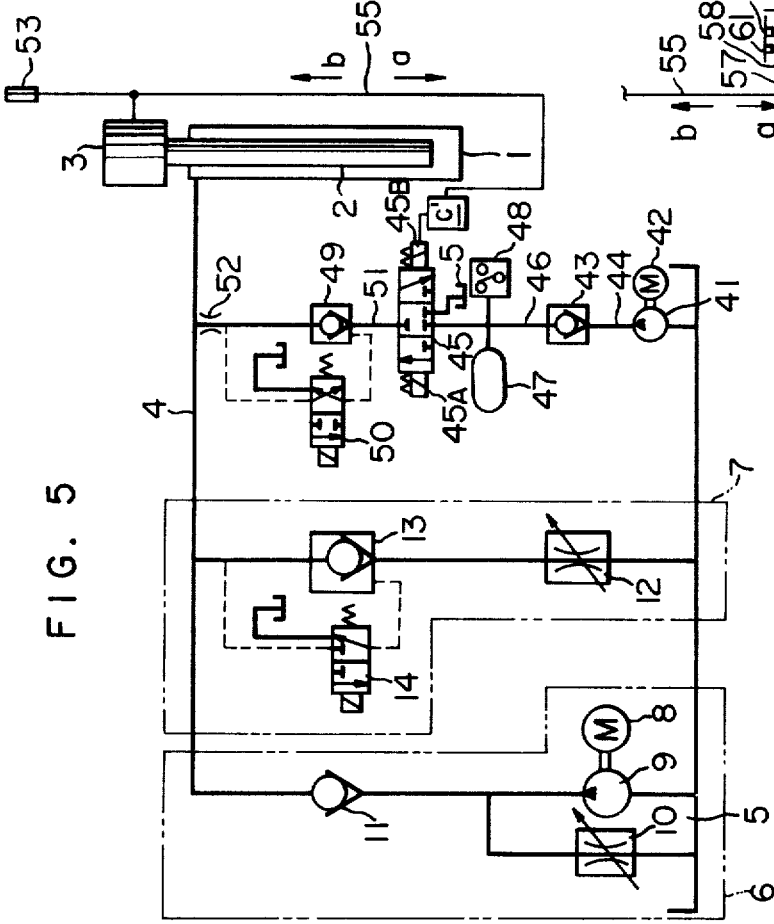

FIG. 15
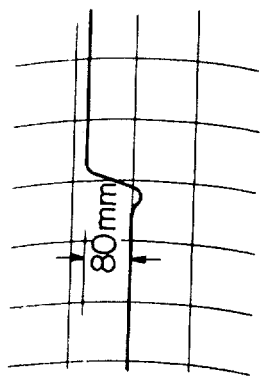
(WITH NO POSITION ADJUSTING DEVICE)
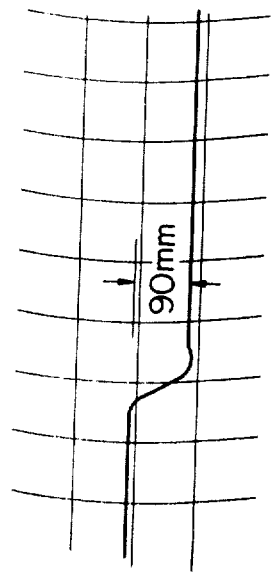
DISPLACEMENT OF CAGE
FIG. 16
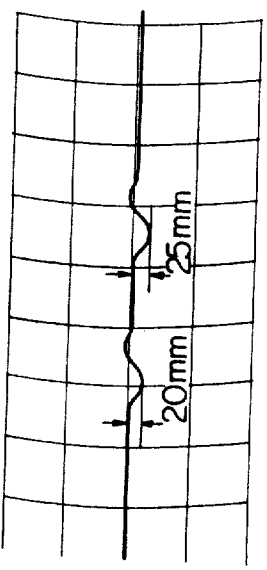
(WITH A POSITION ADJUSTING DEVICE)
DISPLACEMENT OF CAGE

HYDRAULIC ELEVATORS

This invention relates to a hydraulic apparatus comprising a cage carried up and down by a vertically moving plunger, and particularly to a hydraulic apparatus adapted for use in hydraulic elevators.

Hydraulic elevators, as described in U.S. Pat. Nos. 2,953,902 and 3,330,110, comprise a plunger vertically movably received in a cylinder and a cage carried up and down by said plunger incident to vertical movement of the latter. When the cage has arrived at the designated floor by being carried by the plunger, a door of the cage is opened and a person, automobile or other load gets in or off the cage. Loading or unloading of the person or automobile on or from the cage results in a variation of the internal pressure of the cylinder due to the change in load. Namely, when the load within the cage increases, the internal pressure of the cylinder increases compressing the oil accommodated in said cylinder. This compression of oil is attributable to the compressibility of the oil proper and the compressibility of the air contained in said oil, but the latter is much more responsible. Conversely, when the load within the cage decreases, the internal pressure of the cylinder decreases, causing the air mixed in the oil to expand. It is this compression and expansion of oil that effects the vertical movement of the plunger and produces a height difference between the cage and the floor level.

This height difference not only gives an uneasy feeling to the person getting in or off the cage but also possibly induces an accident such as stumbling. Furthermore, loading of heavy articles such as a fork lift on the cage causes an appreciable sinking or downward displacement of the cage, possibly resulting in falling of the article from the fork of the fork lift and, in an extreme case, in such a serious trouble that the fork lift becomes immovable, with its chassis between the front and rear wheels of the fork lift resting on the floor edge.

It is, therefore, an object of the present invention to provide an apparatus which detects the downward or upward displacement of the cage caused by a load change and brings the cage to a level flush with the floor level. Another object is to provide an apparatus which readily detects the downward or upward displacement of the cage and readily brings the cage to the level flush with the floor level.

Still another object is to provide an apparatus of the type described which is simple in construction.

A further object is to provide an apparatus of the type described which requires only a very small size of pump for supplying pressurized oil into the cylinder upon occurrence of downward displacement of the cage.

An additional object of the invention is to provide an apparatus of the type described which will not give an uneasy feeling to the passengers during its operation of bringing the cage to the level flush with the floor level.

According to one embodiment of the present invention an apparatus comprises an endless rope engaged around upper and lower pulleys along the path of vertical movement of a cage and connected with the cage, a rotary directional control valve connected to one of said upper and lower pulleys to be operated thereby for controlling the flow direction of operating oil, said rotary directional control valve and said pulleys being operated only after the cage has arrived at the designated floor, a clutch for connecting said one pulley with said clutch, and an auxiliary conduit connected to a cage operating cylinder through said rotary directional control valve and provided with a check valve below and an accumulator, a check valve and an oil supply pump below said directional control valve. Therefore, the apparatus is operative in such a manner that the pulley and the rotary directional control valve are coupled together by the clutch concurrently or substantially concurrently with the arrival of the cage at the designated floor and, when the cage moves slightly downward or upward in its stopping position, the pulleys are rotated through the rope, actuating the rotary directional control valve and the pressurized oil accumulated in the accumulator provided in the auxiliary conduit is supplied instantaneously to the cylinder in the event of downward movement of the cage, and the pressurized oil in the cylinder is discharged into a tank through the auxiliary conduit in the event of upward movement of the cage. Of course, the rotary directional control valve is held in its neutral position, without supplying or discharging the pressurized oil therethrough, after the cage has been brought to the level flush with the floor level and has not moved down or up in its stopping position.

With the embodiment of the invention constructed as described above, the cage can be brought into flush with the floor level positively and readily upon downward or upward displacement, providing for smooth travel of heavy articles, such as vehicles, into or from the cage. The smooth elimination of a height difference between the floor and cage also prevents the passengers from stumbling or other danger and eliminates fear from the passengers, which the passengers would otherwise have due to the height difference.

According to another embodiment of the invention there is provided an apparatus of the type described, wherein a cam is provided on the pulley shaft, which is adapted to actuate a switch provided with a clutch of the same function as the clutch in the preceding embodiment, while the directional control valve in the auxiliary conduit is replaced by a solenoid operated directional control valve. In this embodiment, since the solenoid operated directional control valve is actuated by the switch which is operated by the cam, there is the remarkable advantage that the auxiliary circuit need not be arranged within the cage travelling path but can be arranged at an optional location.

According to still another embodiment of the invention there is provided an apparatus of the type described, wherein a roller is provided on the cage, which is operated and brought into engagement with a cage guide rail concurrently or substantially concurrently with the arrival of the cage at the designated floor, said roller rotating in one or the other direction, incident to downward or upward displacement of the cage, to rotate a cam mounted on the pulley shaft, which cam in turn actuates a switch to operate a solenoid operated directional control valve provided in the auxiliary conduit, whereby the cage can be readily brought into flush with the floor level. According to this embodiment it is unnecessary to extend a rope within the travelling path of cage and hence a compact apparatus can be obtained.

The present invention will be described more practically by way of example hereunder with reference to the accompanying drawings. It should be understood, however, that the present invention is not restricted only to the embodiments described herein but many modifications are possible to achieve the objects set forth above.

FIG. 1A is an enlarged detailed schematic view of a portion of FIG. 1;

FIG. 5 is a hydraulic circuit diagram of a hydraulic elevator comprising another embodiment of the position adjusting device of the invention;

FIG. 5A is an enlarged detailed schematic view of a portion of FIG. 5;

FIG. 6 is a diagram illustrating the operation of the limit switch in FIG. 5;

FIGS. 15 and 16 are oscillographs showing upward and downward displacement of the cage, FIG. 15 being the case wherein no measure is provided to adjust the position of the cage and FIG. 16 being the case wherein the position adjusting device of the invention is provided.

Figure 1:
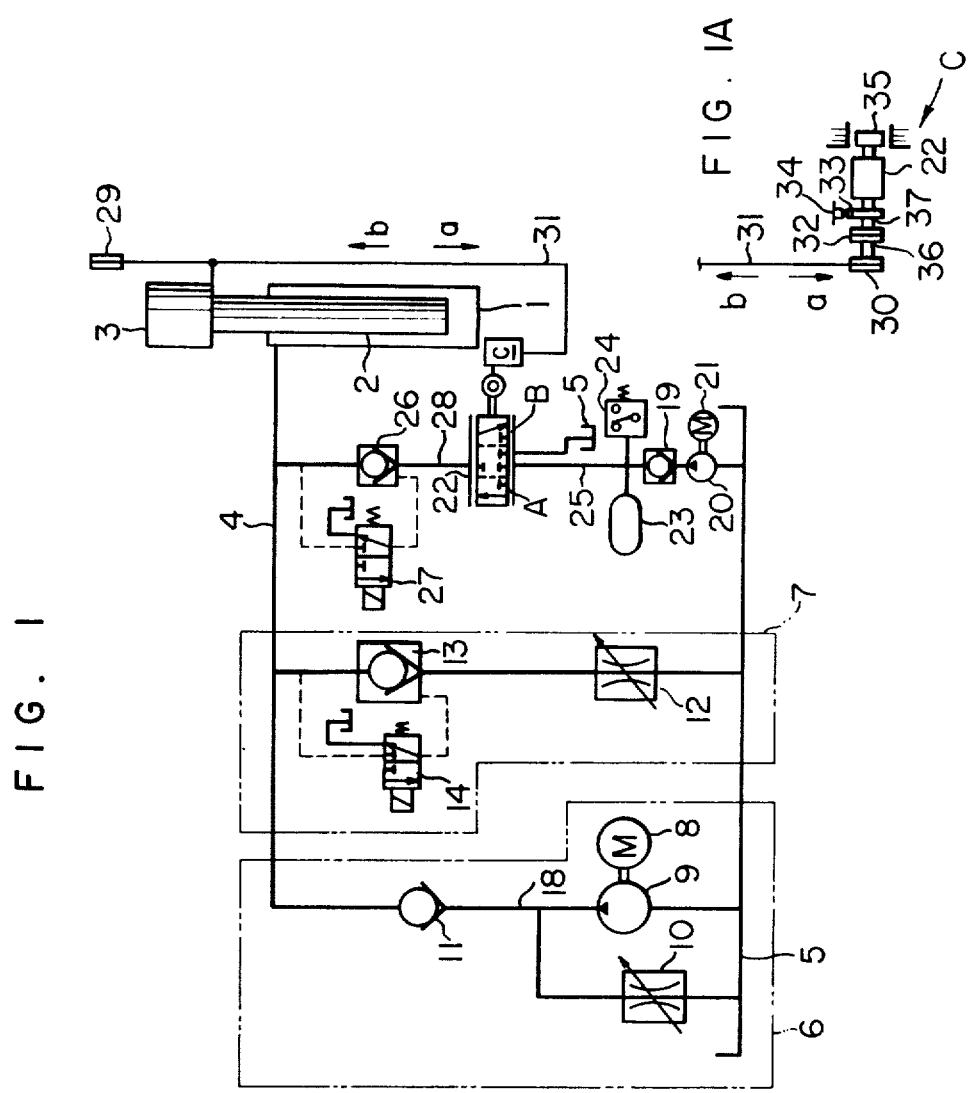
FIG. 1 is a hydraulic circuit diagram of a hydraulic elevator comprising an embodiment of the position adjusting device according to the present invention.

The cage positioning accuracy of a hydraulic elevator is as high as that of an electric elevator. In case of a hydraulic elevator, however, while the cage is positioned at the designated floor with high accuracy, it moves down or up below or above the floor level upon loading of passengers or loads into or unloading of the same from the cage due to the compressive characteristic of operating oil. This phenomenon is called "sinking" and is apparent particularly with a hydraulic elevator having a great height of elevation stroke or operable with a large volume of oil, or with a hydraulic elevator designed for carrying load which is largely variable in weight, with the result that a large height difference occurs between the cage and the floor level.

The height difference between the cage and floor level at the stopping position of the cage, caused by a load change not only diminishes the high cage positioning accuracy, but also limits the stroke of the cage since it becomes larger as the stroke increases.

The problem of height difference is aggravated in hydraulic elevators intended for carrying articles. Namely, the height difference between the cage and floor level is not only extremely detrimental for loading and unloading of articles, but also causes a fork lift to incline as said fork lift travels into the cage, with the result that the article being carried by the fork lift falls down therefrom. The sinking or floating phenomenon of the cage of a hydraulic elevator will be explained hereunder by way of formula:

With $\Delta W$ representing a load change occurring in the stopping position of the cage, $\Delta P$ representing a pressure change in a hydraulic cylinder and high pressure conduit of the elevator, resulting from the load change, $\Delta V$ representing a volume change of operating oil and $\Delta X$ representing the resultant positional change of the cage, it is stated that $$\Delta P = \frac{\Delta W}{A} \qquad (1)$$

$$\Delta V = -\beta \cdot V \cdot \Delta P \qquad (2)$$

$$\Delta X = \frac{\Delta V}{A} \qquad (3)$$

wherein
A: the pressure receiving area of a cage carrying plunger,
$\beta$: the compression ratio of the operating oil,
V: the volume of oil in the hydraulic cylinder and high pressure conduit (but before the load change).

In the event when the load increases, $\Delta W > 0$, $\Delta V < 0$ and $\Delta X < 0$. On the other hand, in the event when the load decreases $\Delta W < 0$, $\Delta V > 0$ and $\Delta X > 0$. The case of $\Delta X < 0$ means sinking of the cage and the case of $\Delta X < 0$ means floating of the cage.

For instance, when $A = 100$ (cm²), $\beta = 0.8 \times 10^{-4}$ (cm²/Kg), $V = 2 \times 10^5$ (cm³) and $\Delta W = 2000$ (Kg), the following values are obtained from formulae (1), (2) and (3):

$\Delta P = 20$ (Kg/cm²)
$\Delta V = -320$ (cm³)
$\Delta X = -3.2$ (cm)

Namely, the oil pressure increases 20 (Kg/cm²) and the oil volume decreases 320 (cm³) from the values before the load change, respectively, and as a result the cage moves down 3.2 cm from the floor level.

The cage positioning accuracy of a hydraulic elevator at the designated floor can be held within the range of $\pm 0.5 - \pm 1.0$ but the downward or upward displacement of the cage caused by a load change is far greater than the values mentioned above, and thus the high cage positioning accuracy becomes significant.

The present invention has been achieved with the view to eliminating the problem described above.

Referring to FIG. 1, a plunger 2 is received in a cylinder 1 and a cage 3 is connected to the top end of the plunger 2. Oil is supplied from a tank 5 through a discharge conduit 18, a check valve 11 and a high pressure conduit 4 to the cylinder 1 by a pump 9 driven by a motor 8. Namely, a flow control valve 10 is fully opened at the start of the pump 9 and, therefore, the pressurized oil is returned entirely to the tank 5 through the flow control valve 10 at the start of the pump 9 but the pressure in the discharge conduit 18 is built up as the opening of the flow control valve 10 is greadually reduced and, when the pressure becomes higher than the pressure in the high pressure conduit 4, the pressurized oil in the discharge conduit 18 forces the check valve 11 open and flows into the high pressure conduit 4. When the flow control valve 10 is fully opened, the oil discharged from the pump 9 entirely flows into the cylinder 1 through the high pressure conduit 4 causing the cage 3 to move upward at the full speed through the plunger 2. When the cage 3 reaches near the desired floor, a control motor (not shown) for the flow control valve 10 is actuated by the function of a limit switch (not shown) which is provided along the path of the cage, with the result that the opening of the flow control valve 10 is increased and the pressurized oil is gradually returned to the tank 5. Thus, the rising speed of the cage 3 is reduced and, when the flow control valve 10 is fully opened, the pressurized oil is returned entirely to the tank 5 and the cage 3 is stopped at the desired floor. Numeral 6 indicates the pressurized oil conduit arrangement for the elevation of the cage 3. Now, the operation of lowering the cage 3 will be described. Indicated by numeral 7 is a pressurized oil conduit arrangement for the lowering of the cage 3. When a lowering command is issued from inside the cage or a predetermined location, a solenoid operated valve 14 moves to the right, leading the pressurized oil in the high pressure conduit 4 to the lower side of a check valve 13 and thus the check valve 13 is opened. As the check valve 13 starts to open and a flow control valve 12 starts to be opened by a control motor (not shown), the pressurized oil in the high pressure conduit 4 is returned to the tank 5 and the cage 3 is gradually lowered.

When the flow control valve 12 is fully opened, the cage 3 moves downward at the full speed and, when the cage 3 thus reaches near the desired floor, the control motor is actuated by the function of a limit switch (not shown) which is provided along the moving path of the cage, and causes the flow control valve 12 to move in a closing direction. By the closing operation of the flow control valve 12, the flow of pressurized oil from the high pressure conduit 4 to the tank 5 is decreased and accordingly the speed of the cage 3 decreases. The flow control valve 12 is completely closed and the cage 3 stops its downward movement, concurrently with the arrival of the cage 3 at the desired floor. Also, the solenoid operated valve 14 slides leftward, thus closing the check valve again and returning the oil conduit arrangement 7 to the condition before the elevator starts.

The apparatus described above is an example of the conventional control apparatus for controlling the upward and downward movements of elevator.

Numerals 19 to 37 indicate a position adjusting device, of which numeral 10 designates a check valve, 20 a pump and 21 an electric motor to drive the pump 20. The pump 20 when driven feeds pressurized oil into a conduit 25 through the check valve 19. The pressurized oil delivered into 2' is conduit is accumulated in an accumulator 23 and, when the oil pressure in the accumulator is built up above a predetermined level, the motor 21 is stopped by the function of a pressure switch 24. When the pressurized oil in the accumulator 23 decreases and the pressure in the conduit 25 falls below the predetermined level, the motor 21 is actuated by the pressure switch 24. Thus, oil of the predetermined pressure is constantly maintained in the accumulator 23. Numeral 22 designates a mechanically operated throttling directional control valve (which will be shifted to a position A when the cage 3 is below a floor level and to a position B when the same is above the floor level). Shifting of this throttling directional control valve is effected by means of a rope 31 by way of schematically depicted control connection C of FIG. 1. FIG. 1A illustrates details of this control connection C. Numeral 26 designates a pilot check valve which is operated by a solenoid operated directional control valve 27. On the other hand, the rope 31 is fixed at its suitable location to the cage 3 and a pulley at the lower end of the rope 31 is operatively connected to the throttling directional control valve 22 through a control shaft 36, an electromagnetic clutch 32, a control shaft 37 and a cam 33. Numeral 34 designates a limit switch operated by the cam 33 and 35 designates an electromagnetic brake.

The electromagnetic clutch 32 is so designed that it will be brought into a position capable of transmitting rotation (a closed position) in response to a signal to open the door of the cage 3 and into a position incapable of transmitting rotation (an open position) in response to a signal to close the door of the cage. Namely, while the rope 31 moves always with the cage 3, since the clutch is in the open position during running of the rope, the throttling directional control valve 22 will be in its neutral position and will not be actuated even if the rope 31 travels, and the clutch will be closed and the movement of the cage 3 will be transmitted to the throttling directional control valve 22 only when the cage is in its stationary position.

Figure 2:
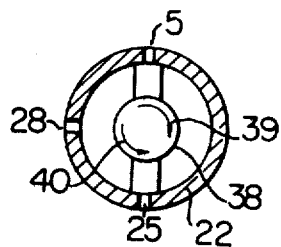
FIG. 2 is a detailed illustrative view of the directional control valve shown in FIG. 1.
Figure 3:
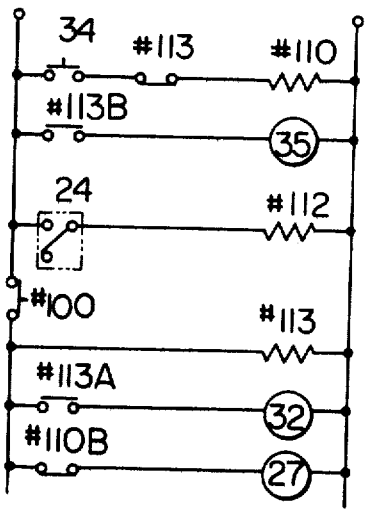
FIG. 3 is an electric circuit diagram of the embodiment of FIG. 1.
Figure 4:
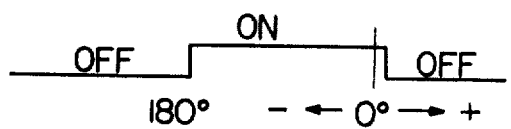
FIG. 4 is a diagram illustrating the operation of the limit switch.

When the cage 3 has arrived at the desired floor and its door has been opened, a switch No. 100 shown in FIG. 3 is turned to its ON position, with the result that a relay No. 113 is energized to close a contact 113A and the electromagnetic clutch 32 is actuated connecting the control shafts 36, 37. At the same time, a contact No. 113B is opened to relieve the electromagnetic brake 35.

i. In the event when the cage 3 has moved up above the floor level:

When the passengers or loads have decreased upon arrival of the cage 3 at the desired floor, the oil pressure in the cylinder 1 decreases and the compressed oil expands due to the pressure reduction. Consequently, the cage 3 moves upward and the rope 31 moves in the direction of b, so that the cam 33 rotates toward the + side as shown in FIG. 4 and the limit switch 34 is opened. As a result, relay No. 110 (FIG. 3) is deenergized to close a contact 110B to thereby operate the solenoid allowing the pressurized oil to flow from the conduit 4 into the pilot check valve 26 to actuate the same. Concurrently, the throttling directional control valve 22 is shifted to the port B (upon rotation of a rotor 38 in the direction of 39) and thus the pressurized oil in the cylinder 1 is discharged from a conduit 28 into the tank 5, with the result that the cage 3 moves gradually downward and reaches its set position (the original position flush with the floor level). When the cage 3 has thus returned to its set position, the throttling directional control valve 22 closes the oil passage to the tank 5 as shown in FIG. 2. At the same time, the limit switch 34 is closed (FIG. 3) and the relay No. 110 (FIG. 3) is again energized to open the contact No. 110B so that the solenoid operated directional control valve is returned to its original position and the pilot check valve 26 is closed.

ii. In the event when the cage 3 has moved down below the floor level:

In the event when additional persons (or loads) have got (or placed) in the cage and the cage has moved down below the floor level, with the pressurized oil in the cylinder 1 being further compressed, the rope 31 moves in the direction of a $a$ and the directional control valve 22 is shifted toward the position A (upon rotation of the rotor in the direction of 40). Concurrently, the pressurized oil in the accumulator 23 flows into the cylinder 1 through the conduits 25, 28 and the pilot check valve, causing the case to move gradually upward through the plunger 2. When the oil pressure in the conduit 25 has dropped below a level set by the pressure switch 24 before the cage reaches its set position, the pressure switch 24 is actuated to energize a relay No. 112 (FIG. 3), with the result that the motor 21 is set in motion to drive the sub-pump 20 which supplies the pressurized oil into the conduit 28. When the cage 3 has reached its set position, the directional control valve closes the conduit 25 as shown in FIG. 2 and thus the cage 3 is held stationary in its position. At the same time, the pressurized oil in the conduit 25 is accumulated in an accumulator 23. When the pressure in the conduit 25 has reached a level set in the pressure switch 24, the relay No. 112 is deenergized by said pressure switch 24 (FIG. 3) and the motor 21 is stopped.

The foregoing is the description of an embodiment of the present invention and the advantageous features of this embodiment lie in the fact that not only is it possible to solve the basic problem of a cage combined with a position adjusting device that the height difference between the cage and floor level, occurring at the set position of the cage due to loading or unloading of passengers or loads, should be minimized, but also it is possible to detect positively the floating or sinking phenomenon of the cage, since the detection is effected by the rope connected directly with the cage 3, and also in the fact that not only can the pump 20 for supplying pressurized oil into the cylinder 1 at the occurrence of the sinking phenomen by very small in capacity since the pressurized oil is previously accumulated in the accumulator 23 but also the sinking phenomenon can be readily eliminated since the pressurized oil in the accumulator 23 is supplied instantaneously into the cylinder.

Another embodiment will be described with reference to FIGS. 5 through 7.

In FIG. 5, the alternate long and short dash lines 6, 7 indicate hydraulic circuits for the elevation and lowering of a cage 3 respectively, which have the same performances as those of the circuits shown in FIG. 1. FIG. 5A schematically depicts the features of the control connection designated as C' in FIG. 5.

Numeral 41 designates a sub-pump, 42 an electric motor for driving the sub-pump 41, 43 a check valve, 44 a conduit connecting the pump 41 and the check valve 43 with each other, 45 a solenoid operated directional control valve, 46 a conduit connecting the check valve 43 and the solenoid operated directional control valve 45 with each other, 49 a pilot operated check valve, 50 a solenoid operated directional control valve for operating the pilot operated check valve 49, 51 a conduit connecting the solenoid operated directional control valve 45 and the pilot operated check valve 49 with each other, 53 and 54 pulleys, 55 a rope, 56 an electromagnetic clutch, 57 and 58 control shafts, 59 and 60 cams, 61 and 62 limit switches operated by the cams 59 and 60 respectively and 63 an electromagnetic brake. FIG. 6 illustrates the opening and closing operations of the limit switches 61, 62 and FIG. 7 is an electric circuit for describing this embodiment.

Figure 7:
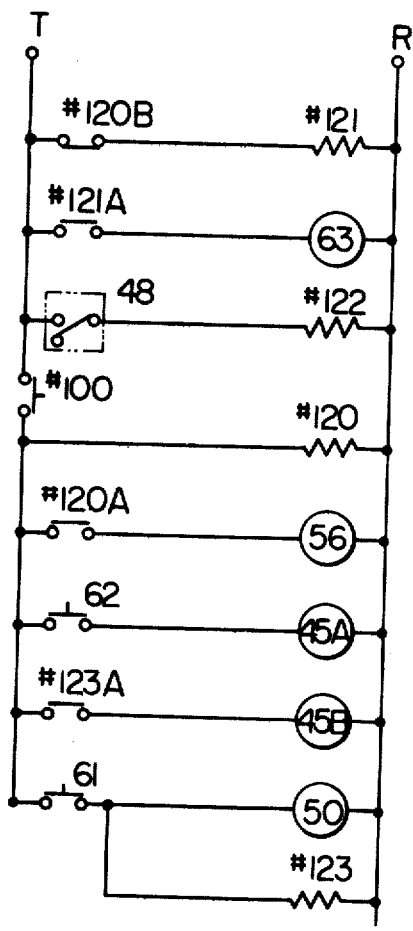
FIG. 7 is an electric circuit diagram of the embodiment of FIG. 5.

When the cage 3 has arrived at the designated floor and its door has been opened, a door switch No. 100 shown in FIG. 7 is closed to energize a relay No. 120, whereupon a contact No. 120A is closed to thereby actuate the electromagnetic clutch 56 connecting the control shafts 57, 58 together. Concurrently, the contactor No. 120B is opened to thereby deenergize the relay No. 121 and the contact No. 121A is opened to relieve the electromagnetizing brake 63.

i. In the event when the cage 3 has moved up above the floor level:

When the persons (or loads) within the cage have decreased upon arrival of the cage 3 at the designated floor, the oil pressure in the cylinder 1 decreases and the compressed oil expands due to the pressure reduction. Consequently, the cage 3 moves upward above the floor level, with the rope 55 moving in the direction of $b$. The limit switch 61 is closed as shown in FIG. 6 and the solenoid operated directional control valve 50 is actuated (FIG. 7). The pressurized oil in the conduit 4 is supplied through a throttle valve 52 to the pilot operated check valve 49 to open the same. Concurrently, contact No. 123A is closed by energizing a relay No. 123 to thereby energize an electromagnet 45B which operates the solenoid operated directional control valve 45, and the pressurized oil in the cylinder 1 is discharged into the tank 5 through the conduit 51 and solenoid operated directional control valve 45. As a result, the cage 3 is slowly lowered by the function of the throttle valve 52 and reaches the set position. Upon arrival of the cage at the set position, the limit switch 61 is opened, so that the solenoid operated directional control valves 50 is deenergized owing to this opening, concurrently therewith the relay No. 123 being also deenergized, and the electromagnet 45B is deenergized owing to the opening of the contact No. 123A, and the pilot operated check valve 49 and the solenoid operated directional control valve 45 are closed. Thus, the cage 3 is held stationary at the set position.

ii. In the event when the cage 3 has moved down below the floor level:

In the event when additional persons (or loads) have entered the cage and the cage has moved down below the floor level, with the pressurized oil in the cylinder 1 being further compressed, the rope 55 moves in the direction of $a$ and the limit switch 62 is closed as shown in FIG. 7. Therefore, an electromagnet 45A to operate the solenoid operated directional control valve 45 is energized as shown in FIG. 7. At the same time, the pressurized oil in an accumulator 47 is supplied to the cylinder 1 through the conduit 46, the solenoid operated directional control valve 45, the conduit 51, the pilot operated check valve 49, the throttle valve 52 and the conduit 4, with the cage 3 moving gradually upward through the plunger 2. In the event when the oil pressure in the conduit 46 has dropped below the value set in the pressure switch 48 prior to arrival of the cage 3 at the set position, the pressure switch 48 operates at once to energize relay No. 122 (FIG. 7), with the result that the electric motor 42 is driven and pressurized oil is supplied to the cylinder 1 by the sub-pump 41 which is driven by said electric motor 42. When the cage 3 has arrived at the set position, the limit switch (FIG. 6) is opened to denergize the electromagnet 45A, so that the solenoid operated directional control valve 45 returns to its neutral position closing the conduit 46 and thus the cage 3 is held stationary at its set position. At the same time, the pressurized oil passing in the conduit 46 is accumulated in the accumulator 47 until the pressure in said conduit 46 reaches the preset level. The relay No. 122 (FIG. 7) is deenergized and the electric motor 42 stops its rotation when the pressure in the conduit 46 has reached the level set in the pressure switch 48.

This embodiment is characterized by the fact that the operating cams 59, 60 for the switches 61, 62 which operate the solenoid operated directional control valve 45 are provided on the control shaft 58 connected with the lower pulley 54. Since the solenoid operated directional control valve 45 can be operated by the cams 59, 60 and the switches 61, 62 as described, it becomes possible to arrange the auxiliary pressurized oil conduit at an optional location. Furthermore, the provision of the throttle valve 52 ensures troublefree operation of the solenoid operated directional control valve 45 which controls the flow direction of oil instantaneously. Namely, should the throttle valve 52 not be provided, since the solenoid operated directional control valve 45 operates instantaneously, the pressurized oil would flow out abruptly from the high pressure conduit 4 or from the accumulator 47 into the high pressure conduit 4, causing the cage 3 to suddenly move up or down frightening the passengers. With the throttle valve 52, the quantity of pressurized oil discharged from the flowing into the high pressure conduit 4 is regulated and the abrupt downward or upward movement of the cage can be avoided. Still another embodiment will be described with reference to FIGS. 8 through 9.

Figure 8:
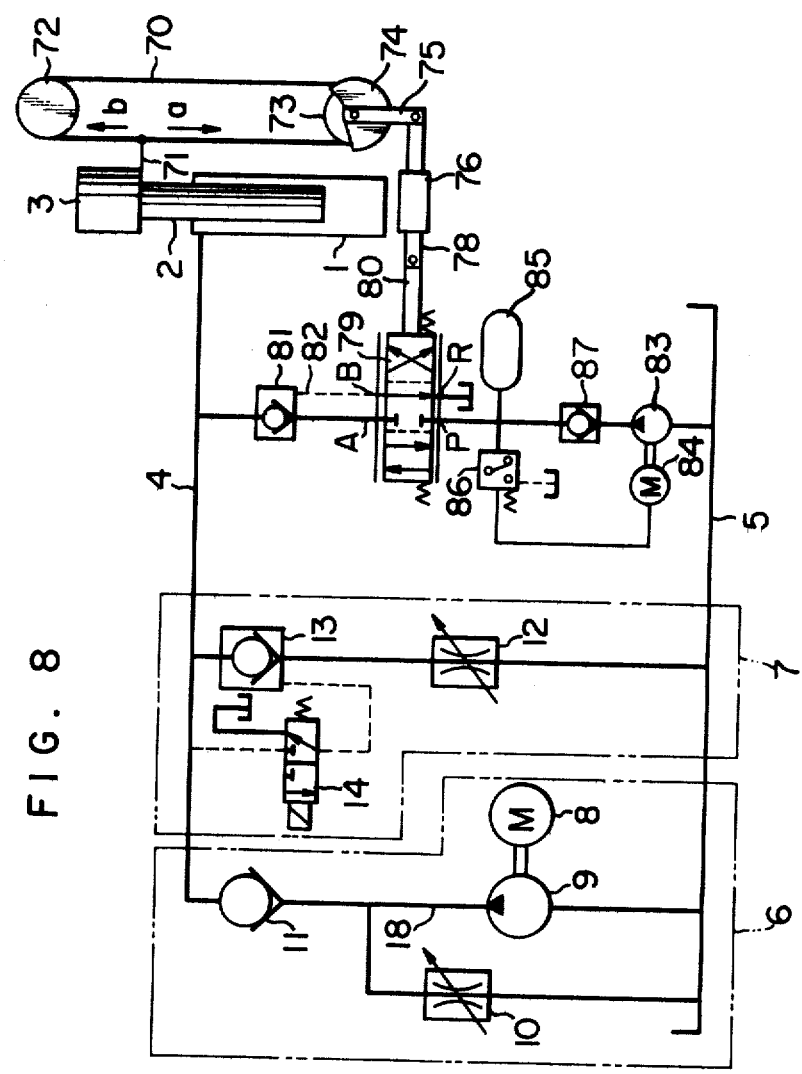
FIG. 8 is a hydraulic circuit diagram of a hydraulic elevator comprising still another embodiment of the position adjusting device of the invention.
Figure 9:
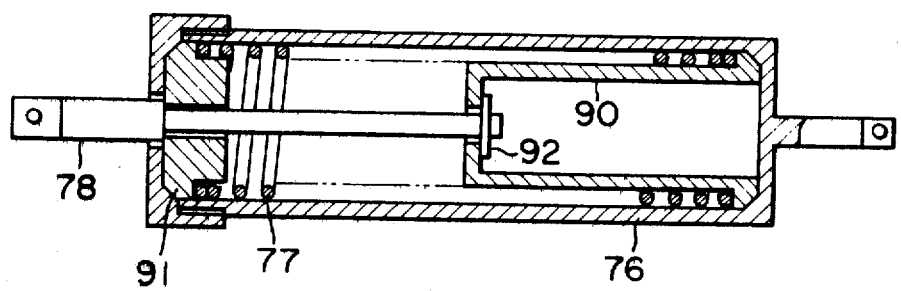
FIG. 9 is a view showing the construction of the displacement absorbing means used in the embodiment of FIG. 8.
Figure 11:
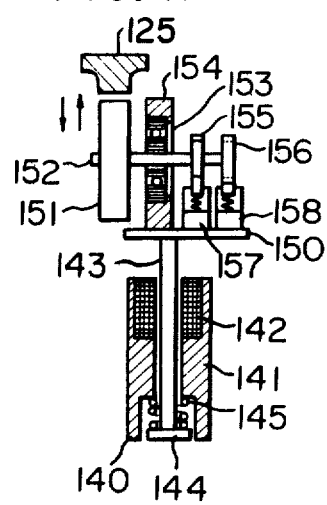
FIG. 11 is an enlarged view of the detecting means used in the embodiment of FIG. 10.

In FIG. 8, the alternate long and short dash lines 6, 7, similar to those in FIGS. 1 and 5, indicate hydraulic circuits for the elevation and lowering of the cage respectively, which have the same performances. Numeral 70 designates a wire rope, 71 an arm fixedly connecting the wire rope 70 with the cage 3, 72 a guide pulley for the wire rope 70, 73 another pulley for transmitting a displacement of the wire rope, 74 an electromagnetic clutch, 75 a lever, 76 a displacement absorbing device, 77 a spring (FIG. 9), 78 an operating rod, 79 a pilot valve, 80 a guide valve spool, 81 a pilot operated check valve, (substantially the same valve as the throttling directional control valve), 82 a pilot conduit, 83 a sub-pump, 84 an electric motor for driving the sub-pump 83, 85 an accumulator in which the oil discharged from the pump 83 is to be accumulated, 86 a pressure switch by which the oil pressure in the accumulator 85 is maintained constant and 87 a check valve. The displacement absorbing device 76 is composed of the spring 77, the operating rod 78, guides 90 and 91, and a stopper 92, said guides 90, 91 compressing the spring 77 when the cage 3 makes a large displacement, thereby preventing the abrupt displacement from being transmitted to the pilot valve 79.

i. In the event when the cage 3 moves up above the floor level:

In the event when the passengers (or loads) within the cage have decreased upon arrival of the cage at the designated floor, the oil pressure in the cylinder 1 decrease and the compressed oil expands due to the pressure reduction. As a result, the cage 3 moves upward above the floor level, with the rope 70 moving in the direction of b. The pulley 73 and the lever 75 respectively are subjected to an angular displacement which causes the spool 80 of the pilot valve 79 to move to the left through the displacement absorbing device 76. The pressurized oil in the accumulator 85 is allowed to flow through a port P into the pilot operated check valve 81 causing said valve to make an opening operation. The pressurized oil in the cylinder 1 is discharged from the port A through a part R of the guide valve 79 into the tank 5, whereby the cage is returned to the original stopping position.

ii. In the event when the cage 3 has moved down below the floor level:

In the event when additional persons (or loads) have got (or placed) in the cage 3 and the cage has moved down below the floor level, with the pressurized oil in the cylinder 1 being further compressed, the rope 70 moves in the direction of the arrow a, causing angular displacement of the pulley 73 and the lever 75 in the opposite direction and hence rightward movement of the spool 80 of the pilot valve 79 through the displacement absorbing device 76.

In this case, the communication between the port P and port A is established in the pilot valve 79 and the pressurized oil accumulated in the accumulator 85 is supplied from the port P through the port A into the cylinder 1. Thus, the cage 3 is returned to its original stopping position.

The displacement absorbing device 76 serves to protect the guide valve 79 when the cage 3 is subjected to a large displacement, by absorbing the displacement subsequent to movement of the spool 80 of the pilot valve 79. According to this embodiment, it becomes possible to make small the diameter of the pulley 73 of the adjusting device and to make large the feedback gain, and consequently to achieve quick adjustment. It is to be noted here that the biasing force of the spring 77 disposed in the displacement absorbing device 76 is made larger than the force required for operating the spool of the pilot valve 79, to make the displacement absorbing device 76 effective.

Referring now to FIGS. 10 through 13, numeral 101 designates a tank, 103 a variable capacity pump (hereinafter referred to simply as pump), 105 a main electric motor for driving the pump 103, 107 a control electric motor for varying the oscillation angle of the pump 103, 109 a pilot operated check valve (hereinafter referred to simply as check valve), 110 a main conduit connecting the pump 103 and the pilot operated check valve 109 with each other, 113 a relief valve for maintaining the pressure inside the main conduit 110 below a set level, 115 a hydraulic cylinder, 117 a plunger and 119 a cage.

Numeral 121 designates a main conduit connecting the check valve 109 and the hydraulic cylinder 115 with each other, and 123 designates solenoid operated valve for opening the pilot operated check valve 109 by a pilot operation.

Numeral 125 designates a rail and 127 designates guide rollers for guiding the cage 119. Numeral 129 designates a sub-pump, 131 an electric motor for driving the sub-pump 129, 133 an electromagnetic valve, 135 a pilot check valve (hereinafter referred to simply as check valve), 137 a throttle valve, 139 an electric wiring, 140 an electromagnet for urging a position detecting device into pressure engagement with the rail 125, and 150 the position detecting device. The electromagnet 140 and the position detecting device 150 are respectively composed of the members as exemplified in FIG. 11. The electromagnet 140 is composed of a case 141, a magnet coil 142, a rod 143, a spring seat 144 and a return spring 145, while the position detecting device 150 is composed of a roller 151, a shaft 152, a bearing 153, a bearing support 154, cams 155, 156 and cam switches 157, 158.

i. In the event when it is desired to move the cage 119 upward:

The pump 103 is driven by the main electric motor 105 and the oscillation angle is varied to the plus side by means of the control electric motor 107, whereby the required quantity of oil is supplied to the hydraulic cylinder 115 to elevate the cage 119 through the plunger 117.

ii. In the event when it is desired to lower the cage 119:

The electromagnetic valve 112 is energized to open the check valve 109 and concurrently the control electric motor 107 is shifted to the minus side to discharge the pressurized oil from the hydraulic cylinder into the tank, whereby the cage 119 is moved downward. The normal operation of these embodiments will not be described in detail herein as it does not constitute part of the present invention.

Operation of the cage position control apparatus according to the invention:

The coil 142 of the electromagnet is excited at the same time when the cage 119 has stopped and the cage door starts to open, whereby the rod 143 is pushed up and the roller 151 is urged against the rail 125.

When the door of the cage 119 starts to close, the coil 142 of the electromagnet is deenergized, so that said rod is returned to the original position by the return spring and the position detecting roller 151 is separated from the rail 125.

i. In the event when the cage 119 has moved up above the floor level:

In the event when the cage 119 has moved up above the floor level due to the reduction of load, the roller 151 in pressure contact with the rail 125 rotates, causing the cams 155, 156 to rotate through the shaft 152. Thus, the cam switch 157 is actuated by the cam 155. Upon actuation of the cam switch 157, the electromagnetic valve 133A is excited to open the check valve 135. The pressurized oil in the hydraulic cylinder is discharged into the tank through the throttle valve 137, with the result that the cage 119 is moved downward. When the cage has moved down and reached the level flush with the floor level, the cam switch 157 is opened, whereby the electromagnetic valve 133 is returned to its neutral block and the check valve 135 is closed, to hold the cage 119 in its position.

ii. In the event when the cage 119 has moved down below the floor level:

In the event when the cage 119 has moved down below the floor level due to the increase of load, the roller 151 in pressure contact with the rail 125 rotates in the opposite direction, causing the cams 155, 156 to rotate through the shaft 152. Thus, the cam switch 158 is actuated by the cam 156. Upon actuation of the cam switch 158, the electromagnetic valve 133B is excited and the pressurized oil discharged from the sub-pump 129 is supplied to the hydraulic cylinder 115 through the check valve 135 and the throttle valve 137. The cage 119 is lifted through the plunger 117, and when it has reached the level flush with the floor level, the cam switch 158 is opened, whereby the electromagnetic valve 133 is returned to its neutral block and the cage 119 is held in its position.

Figure 12:
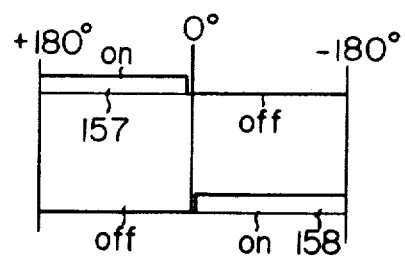
FIG. 12 is a diagram illustrating the operation of the cam switch used in the embodiment of FIG. 10.
Figure 14:
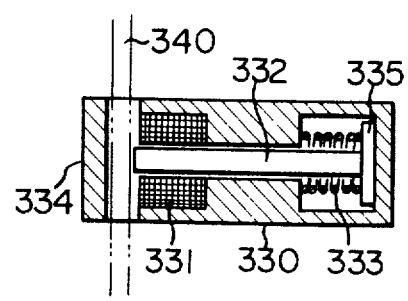
FIG. 14 is an enlarged view of the electromagnet used in the embodiment of FIG. 13.
Figure 10:
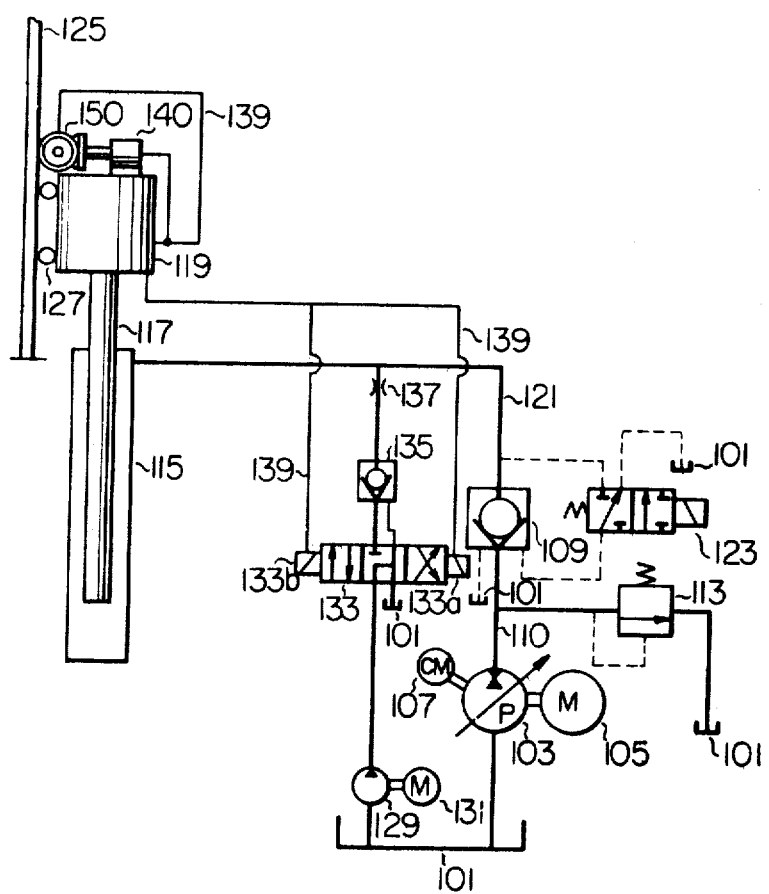
FIG. 10 is a hydraulic circuit diagram of a hydraulic elevator comprising still another embodiment of the position adjusting device of the invention.

FIG. 12 is a diagram illustrating the operations of the cam switches 157, 158 which are arranged to be actuated when rotated to the plus side and to the minus side respectively.

This embodiment is advantageous in that there is no necessity for adjusting the rope which is extended along the side wall defining the path of travel of the cage and is connected with the cage 119, and hence the installation of the apparatus is very easy. A further advantage is that according to this embodiment, it is entirely unnecessary to take into consideration the removal of slack of the rope, which must normally be considered after the rope has been extended, and in addition, the useful life of the roller can be extended as the roller is brought into contact with the rail only when the cage has arrived at the designated floor.

Still another embodiment of the invention will be described hereunder with reference to FIG. 13.

Figure 13:
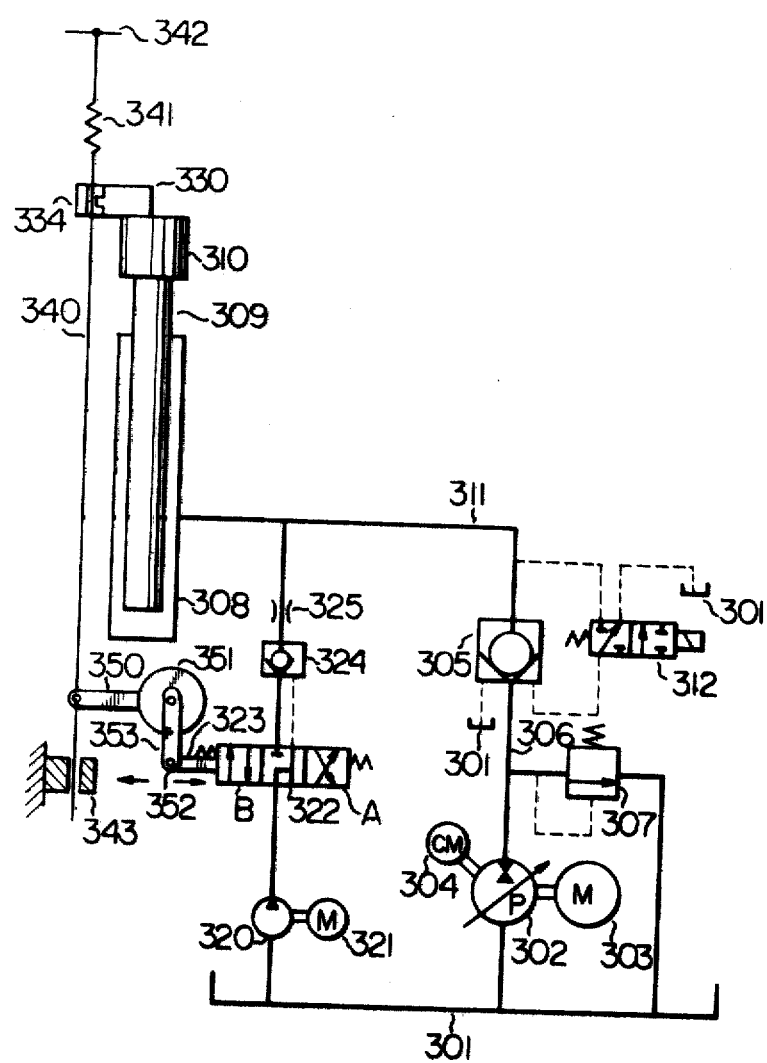
FIG. 13 is a hydraulic circuit diagram of a hydraulic elevator comprising still another embodiment of the position adjusting device of the invention.

In FIG. 13, numeral 301 designates a tank, 302 a variable capacity pump (hereinafter referred to simply as pump), 303 a main electric motor for driving the pump 302, 304 a controller for varying the angle of oscillation of the pump 302, 305 a pilot operated check valve (hereinafter referred to simply as check valve), 306 a main conduit connecting the pump 302 and the check valve 305 with each other, 307 a relief valve for discharging the pressurized oil from the main conduit 306 into the tank therethrough when the pressure in said main conduit has increased above a preset level, thereby to maintain the pressure below the preset level, 308 a hydraulic cylinder, 309 a plunger, 310 a cage, 311 a main conduit connecting the check valve 305 and the hydraulic cylinder with each other, 312 a solenoid operated valve for causing an opening operation of the pilot operated check valve 305 by a pilot operation, 302 an auxiliary pump, 321 an electric motor for driving the auxiliary pump 320, 322 a directional control valve, 323 an arm for mechanically operating the directional control valve 322, 324 a pilot operated check valve (hereinafter referred to simply as check valve), 325 a throttle valve, 330 an electromagnet, 340 a rod, 341 a tension spring for causing a vertical movement of the rod 340, 342 a member supporting the tension spring 341, 343 a guide for the rod 340, 350 a link for transmitting the vertical movement of the rod 340 to a wheel 351, 352 a pin, and 353 a lever for transmitting an angular displacement of the wheel 351 to the arm 323 of the directional control valve 322 through the pin 352 to operate said arm 323.

The magnet coil 331 of the electromagnet is excited at the same time when the door of the cage 310 starts to open upon stoppage of the cage 310, whereby the magnet rod 332 is projected overcoming the biasing force of a return spring 333, thus fixing the rod 340 to the guide 334.

On the other hand, when the door of the cage 310 starts to close, the magnet coil 331 is deenergized and the magnet rod 332 is returned to its original position by the return spring 333, so that the guide 334 and rod 340 are separated and the rod 340 has no bearing on the cage 310.

i. In the event when the cage has moved up above the floor level:

In the event when the cage moves up above the floor level due to the decrease of load while the cage is in its stationary position, the rod 340 also moves up while compressing the tension spring 341. Concurrently, the link 350 fixed to the rod 340 causes an angular displacement of the wheel 351.

Therefore, the lever 353 moves the arm 323 of the directional control valve 322 in the direction of the solid line arrow through the pin 352, with the result that said directional control valve 322 is shifted to its A position. Thus, the pressurized oil discharged from the auxiliary pump 320 is supplied to the pilot port of the check valve 324 to cause an opening operation of said check valve. The pressurized oil in the hydraulic cylinder 308 is discharged therefrom into the tank and the cage 310 readily moves down. When the cage 310 has reached a level flush with the floor level, the rod 340 returns to its original position, so that the directional control valve 322 is returned to its neutral block and the check valve 324 is closed. Thus, the cage 310 is held stationary in its position.

ii. In the event when the cage has moved down below the floor level:

In the event when the cage 310 moves down due to the increase of load while it is in its stationary position, the rod 340 also moves down while pulling the tension spring. At the same time, the link 350 fixed to the rod 340 causes an angular displacement of the wheel 351.

Therefore, the lever 353 causes the arm 323 of the directional control valve 322 to move in the direction of the dotted line arrow through the pin 352, whereby said directional control valve 322 is shifted to its B position. The pressurized oil discharged from the sub-pump 320 is thus supplied to the hydraulic cylinder 308 through the check valve 324 and the throttle valve 325, with the result that the cage 310 starts to move upward through the plunger 309.

When the cage 310 has reached a level flush with the floor level, the rod 340 returns to its original position, so that the directional control valve 322 is returned to its neutral block and the cage 310 is held stationary in its position.

In the embodiment described above, the rod 340 consists of a rod-shaped body and the spring 341 is provided at the upper end thereof, but it is to be understood that the spring may be provided at the lower end of the rod, with the upper end of said rod being in the form of free end. It is also to be understood that, while the directional control valve is directly operated in the embodiment described, it may be operated by an electromagnet or the like upon detecting the vertical position of the rod by a cam, to achieve the same purpose.

Although the present invention has been described and illustrated herein solely as applied to a hydraulic elevator, it is to be noted that it is applicable also to fork lifts and the like equipments.

FIGS. 15 and 16 are oscillographs respectively showing the displaceme. + of a cage not provided with a position adjusting device and a cage provided with the position adjusting device of the invention shown in the embodiment of FIG. 8, when a truck of 1000 kg was carried into and out of the cage at the speed of 60 cm/s. As may be apparent from FIG. 15, when the position adjusting device is not provided, the cage moves down 90 mm when the truck is carried in and moves up 80 mm when the truck is carried out. As contrasted, when the position adjusting device of the invention is provided, as may be apparent from FIG. 16, the maximum distance of downward movement is only 25 mm and of the upward movement is only 45 mm, and the cage returns to its original position within only 1 second. The distances of 20 mm and 25 mm of the downward movement of the cage, shown in the oscillograph mean that the cage moved down 20 mm when the front wheels of the truck got on the cage and moved down 25 mm when the rear wheels of the truck got on the cage. Likewise, the distances of 45 mm and 30 mm mean that the cage moved up 45 mm when the rear wheels of the truck were cleared from the cage and moved up 30 mm when the front wheels of the truck cleared from the cage.

What is claimed is:

1. A fluid operated elevator comprising:

a load accommodating cage, a plunger and a cylinder which are movable with respect to one another in response to supply of pressurized fluid therebetween, said cage being connected to one of said plunger and cylinder for movement therewith, pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction, main fluid control means for controlling the supply and discharge of said pressurized fluid to said space such that said cage is moved between a plurality of predetermined stop positions at respective spaced loading and unloading stations, detecting means for detecting displacement of said cage in said first and second directions from respective stop positions of said cage, cage position adjusting means responsive to signals from said detecting means which indicate displacement of said cage from the respective stop position for automatically returning said cage to said respective stop position by controlling the respective supply and discharge of pressurized fluid from said space, said detecting means including: a first member operatively connected to said adjusting means for actuating said adjusting means in response to movement of said first member, a second member connected to said cage such that said second member is moved whenever said cage is moved, and clutch means for selectively coupling and uncoupling said first and second members to one another such that said first and second members move together when said clutch means is engaged and such that said second member and cage move independently of said first member when said clutch means is disengaged, and clutch control means for engaging said clutch means only after said cage has arrived at a respective stop position for loading and unloading of said cage, wherein said control means includes means for automatically engaging said clutch means after said cage has arrived at a respective stop position and before initiation of any loading or unloading of said cage and for automatically disengaging said clutch means after completion of any loading or unloading of said cage and before movement of said cage to another stop position, whereby said clutch is engaged only when said cage is in a condition for accommodating loading and unloading thereof such that said adjusting means is operative for accommodating changing loads on said cage, wherein said adjusting means includes an auxiliary fluid circuit for supplying pressurized fluid into said space independently of the operation of the main fluid control means, said auxiliary fluid circuit including:

an auxiliary conduit communicating with said space, an auxiliary pump for supplying pressurized fluid to said auxiliary conduit, a check valve in said auxiliary conduit for preventing backflow of fluid to said auxiliary pump, a direction control valve for controlling the flow of pressurized fluid through said auxiliary conduit, and an accumulator interposed between said auxiliary pump and said control valve for accumulating a supply of pressurized fluid, and wherein said control valve is movable in response to said signals from said detecting means for controlling communication of said accumulator with said space.

2. An elevator according to claim 1, wherein said check valve is interposed in said auxiliary conduit between said auxiliary pump and said control valve, further comprising a pressure detector for detecting the pressure in the said auxiliary conduit intermediate the check valve and the control valve, said pressure detector including means for generating starting and stopping signals for said auxiliary pump as a function of the fluid pressure detected.

3. A fluid operated elevator comprising:

a load accommodating cage, a plunger and a cylinder which are movable with respect to one another in response to supply of pressurized fluid therebetween, said cage being connected to one of said plunger and cylinder for movement therewith, pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction, main fluid control means for controlling the supply and discharge of said pressurized fluid to said space such that said cage is moved between a plurality of predetermined stop positions at respective spaced loading and unloading stations, detecting means for detecting displacement of said cage in said first and second directions from respective stop positions of said cage, cage position adjusting means responsive to signals from said detecting means which indicate displacement of said cage from the respective stop position for automatically returning said cage to said respective stop position by controlling the respective supply and discharge of pressurized fluid from said space, said detecting means including: a first member operatively connected to said adjusting means for actuating said adjusting means in response to movement of said first member, a second member connected to said cage such that said second member is moved whenever said cage is moved, and clutch means for selectively coupling and uncoupling said first and second members to one another such that said first and second members move together when said clutch means is engaged and such that said second member and cage move independently of said first member when said clutch means is disengaged, and clutch control means for engaging said clutch means only after said cage has arrived at a respective stop position for loading and unloading of said cage, wherein said control means includes means for automatically engaging said clutch means after said cage has arrived at a respective stop position and before initiation of any loading or unloading of said cage and for automatically disengaging said clutch means after completion of any loading or unloading of said cage and before movement of said cage to another stop position, whereby said clutch is engaged only when said cage is in a condition for accommodating loading and unloading thereof such that said adjusting means is operative for accommodating changing loads on said cage, wherein said adjusting means includes an auxiliary fluid circuit for supplying pressurized fluid into said space independently of the operation of the main fluid control means, said auxiliary fluid circuit including:

an auxiliary conduit communicating with said space, pressure supply means for supplying pressurized fluid to said auxiliary conduit, and a directional control valve interposed in said auxiliary conduit, said control valve including means for permitting the discharge of pressurized fluid from said space through a portion of said auxiliary conduit in response to said signals from said detecting means which indicate displacement of said cage in said first direction from a respective stop position.

4. An elevator according to claim 3, wherein a restriction is provided in a portion of said auxiliary circuit which connects said control valve with said space for attenuating abrupt changes in supply and discharge of said pressurized fluid to and from said space.

5. An elevator according to claim 3, wherein said first direction is up and said second direction is down such that discharge of said pressurized fluid is aided by gravity forces acting through said cage.

6. An elevator according to claim 2, wherein said pressure detector includes means for sending a stopping signal to the auxiliary pump when the detected fluid pressure is increased above a predetermined level and means for sending a stopping signal to the auxiliary pump when the detected fluid pressure drops below a predetermined level.

7. A fluid operated elevator comprising:

a load accommodating cage, a plunger and a cylinder which are movable with respect to one another in response to supply of pressurized fluid therebetween, said cage being connected to one of said plunger and cylinder for movement therewith, pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction, main fluid control means for controlling the supply and discharge of said pressurized fluid to said space such that said cage is moved between a plurality of predetermined stop positions at respective spaced loading and unloading stations, detecting means for detecting displacement of said cage in said first and second directions from respective stop positions of said cage, cage position adjusting means responsive to signals from said detecting means which indicate displacement of said cage from the respective stop position for automatically returning said cage to said respective stop position by controlling the respective supply and discharge of pressurized fluid from said space, said detecting means including: a first member operatively connected to said adjusting means for actuating said adjusting means in response to movement of said first member, a second member connected to said cage such that said second member is moved whenever said cage is moved, and clutch means for selectively coupling and uncoupling said first and second members to one another such that said first and second members move together when said clutch means is engaged and such that said second member and cage move independently of said first member when said clutch means is disengaged, and clutch control means for engaging said clutch means only after said cage has arrived at a respective stop position for loading and unloading of said cage, wherein said control means includes means for automatically engaging said clutch means after said cage has arrived at a respective stop position and before initiation of any loading or unloading of said cage and for automatically disengaging said clutch means after completion of any loading or unloading of said cage and before movement of said cage to another stop position, whereby said clutch is engaged only when said cage is in a condition for accommodating loading and unloading thereof such that said adjusting means is operative for accommodating changing loads on said cage, and wherein said second member is a pulley which is rotated by connecting line means in response to displacement of said cage.

8. A fluid operated elevator comprising:

a load accommodating cage, a plunger and a cylinder which are movable with respect to one another in response to supply of pressurized fluid therebetween, said cage being connected to one of said plunger and cylinder for movement therewith, pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction, main fluid control means for controlling the supply and discharge of said pressurized fluid to said space such that said cage is moved between a plurality of predetermined stop positions at respective spaced loading and unloading stations, detecting means for detecting displacement of said cage in said first and second directions from respective stop positions of said cage, cage position adjusting means responsive to signals from said detecting means which indicate displacement of said cage from the respective stop position for automatically returning said cage to said respective stop position by controlling the respective supply and discharge of pressurized fluid from said space, said detecting means including: a first member operatively connected to said adjusting means for actuating said adjusting means in response to movement of said member, a second member connected to said cage such that said second member is moved whenever said cage is moved and, clutch means for selectively coupling and uncoupling said first and second members to one another such that said first and second members move together when said clutch means is engaged and such that said second member and cage move independently of said first member when said clutch means is disengaged, and clutch control means for engaging said clutch means only after said cage has arrived at a respective stop position for loading and unloading of said cage, wherein said control means includes means for automatically engaging said clutch means after said cage has arrived at a respective stop position and before initiation of any loading or unloading of said cage and for automatically disengaging said clutch means after completion of any loading or unloading of said cage and before movement of said cage to another stop position, whereby said clutch is engaged only when said cage is in a condition for accommodating loading and unloading thereof such that said adjusting means is operative for accommodating changing loads on said cage, wherein said adjusting means includes an auxiliary fluid circuit for supplying pressurized fluid into said space independently of the operation of the main fluid control means, said auxiliary fluid circuit including:

an auxiliary conduit communicating with said space, an auxiliary pump for supplying pressurized fluid to said auxiliary conduit, and a check valve in said auxiliary conduit for preventing backflow of fluid to said auxiliary pump, wherein said auxiliary pump is operated in response to said signals from said detecting means for controlling the supply of pressurized fluid to said auxiliary conduit, and wherein said second member is a pulley which is rotated by connecting line means in response to displacement of said cage.

9. An elevator according to claim 1, wherein said second member is a pulley which is rotated by connecting line means in response to displacement of said cage.

10. An elevator according to claim 9, wherein said check valve is disposed intermediate the auxiliary pump and the accumulator.

11. An elevator according to claim 10, wherein a second check valve is interposed in said auxiliary fluid circuit between said control valve and said space.

12. An elevator according to claim 8, wherein said first member is a rotatable operating shaft provided with a cam, wherein said control valve is controlled directly by a solenoid, and wherein said cam is engageable with switch means which control energization of said solenoid such that when said clutch means is engaged, said operating shaft is rotated along with said pulley during displacement of said cage with a resultant control of said switch means by said cam and consequent movement of said control valve and adjustment of the cage position.

13. An elevator according to claim 7, wherein said first member is a rotatable operating shaft provided with a cam, wherein said control valve is controlled directly by a solenoid, and wherein said cam is engageable with switch means which control energization of said solenoid such that when said clutch means is engaged, said operating shaft is rotated along with said pulley during displacement of said cage with a resultant control of said switch means by said cam and consequent movement of said control valve and adjustment of the cage position.

14. An elevator according to claim 12, wherein a restriction is provided in the auxiliary conduit between said control valve and said space.

15. An elevator according to claim 7, wherein said control valve is mechanically linked by mechanical linkage means directly with said first member such that movement of said first member effects a movement of said control valve, and wherein displacement absorbing means are provided in said mechanical linkage means for attenuating abrupt displacement of said first member caused by corresponding abrupt displacement of said cage.

16. An elevator according to claim 8, wherein said control valve is mechanically linked by mechanical linkage means directly with said first member such that movement of said first member effects a movement of said control valve, and wherein displacement absorbing means are provided in said mechanical linkage means for attenuating abrupt displacement of said first member caused by corresponding abrupt displacement of said cage.

17. An elevator according to claim 15, wherein said displacement absorbing means includes spring means.

18. An elevator according to claim 16, wherein said check valve is disposed intermediate the auxiliary pump and the accumulator.

19. An elevator according to claim 18, further comprising a second check valve interposed between said control valve and said space for preventing backflow of fluid to said control valve.

20. An elevator according to claim 16, further comprising a restriction in said auxiliary conduit intermediate said space and said control valve for attenuating abrupt changes in supply and discharge of said pressurized fluid to and from said space.

21. An elevator according to claim 15, wherein said mechanical linkage means includes a pivotal lever connected to said pulley for pivotal movement when said pulley rotates with said clutch means engaged, and wherein said displacement absorbing means includes a spring interposed between said pivotal lever and a movable control spool of said control valve.

22. A fluid operated elevator comprising:

a load accommodating cage, a plunger and a cylinder which are movable with respect to one another in response to supply of pressurized fluid therebetween, said cage being connected to one of said plunger and cylinder for movement therewith, pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction, main fluid control means for controlling the supply and discharge of said pressurized fluid to said space such that said cage is moved between a plurality of predetermined stop positions at respective spaced loading and unloading stations, detecting means for detecting displacement of said cage in said first and second directions from respective stop positions of said cage, cage position adjusting means responsive to signals from said detecting means which indicate displacement of said cage from the respective stop position for automatically returning said cage to said respective stop position by controlling the respective supply and discharge of pressurized fluid from said space, said detecting means including: a first member operatively connected to said adjusting means for actuating said adjusting means in response to movement of said first member, a second member connected to said cage such that said second member is moved whenever said cage is moved, and clutch means for selectively coupling and uncoupling said first and second members to one another such that said first and second members move together when said clutch means is engaged and such that said second member and cage move independently of said first member when said clutch means is disengaged, and clutch control means for engaging said clutch means only after said cage has arrived at a respective stop position for loading and unloading of said cage, wherein said control means includes means for automatically engaging said clutch means after said cage has arrived at a respective stop position and before initiation of any loading or unloading of said cage and for automatically disengaging said clutch means after completion of any loading or unloading of said cage and before movement of said cage to another stop position, whereby said clutch is engaged only when said cage is in a condition for accommodating loading and unloading thereof such that said adjusting means is operative for accommodating changing loads on said cage, and wherein one of said first and second members is a roller and the other of said first and second members is a part which contacts said roller when said clutch means is engaged to cause rotation of said roller in response to relative movement of the roller axis with respect to said part.

23. An elevator according to claim 22, wherein said roller is connected to and movable with said cage, wherein said part is a rail disposed adjacent the travel path of said cage and roller, and wherein said clutch means includes means for moving said rail and roller into and out of contact with one another.

24. An elevator according to claim 23, wherein said clutch means includes electromagnetic means for moving said rail and roller.

25. A fluid operated elevator comprising:
a load accommodating cage,
a plunger and a cylinder which are movable with respect to one another in response to supply of pressurized fluid therebetween, said cage being connected to one of said plunger and cylinder for movement therewith,
pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction,
main fluid control means for controlling the supply and discharge of said pressurized fluid to said space such that said cage is moved between a plurality of predetermined stop positions at respective spaced loading and unloading stations,
detecting means for detecting displacement of said cage in said first and second directions from respective stop positions of said cage,
cage position adjusting means responsive to signals from said detecting means which indicate displacement of said cage from the respective stop position for automatically returning said cage to said respective stop position by controlling the respective supply and discharge of pressurized fluid from said space,
said detecting means including: a first member operatively connected to said adjusting means for actuating said adjusting means in response to movement of said first member, a second member connected to said cage such that said second member is moved whenever said cage is moved and, clutch means for selectively coupling and uncoupling said first and second members to one another such that said first and second members move together when said clutch means is engaged and such that said second member and cage move independently of said first member when said clutch means is disengaged,
and clutch control means for engaging said clutch means only after said cage has arrived at a respective stop position for loading and unloading of said cage,
wherein said adjusting means includes an auxiliary fluid circuit for supplying pressurized fluid into said space independently of the operation of the main fluid control means, said auxiliary fluid circuit including:
an auxiliary conduit communicating with said space,
an auxiliary pump for supplying pressurized fluid to said auxiliary conduit,
and a check valve in said auxiliary conduit for preventing backflow of fluid to said auxiliary pump,
wherein said auxiliary pump is operated in response to said signals from said detecting means for controlling the supply of pressurized fluid to said auxiliary conduit,
and wherein one of said first and second members is a roller and the other of said first and second members is a part which contacts said roller when said clutch means is engaged to cause rotation of said roller in response to relative movement of the roller axis with respect to said part.

26. An elevator according to claim 25, wherein said auxiliary pump is powered by an electric motor and wherein said control valve is an electromagnetic valve.

27. A fluid operated elevator comprising:
a load accommodating cage,
a plunger and a cylinder which are movable with respect to one another in response to supply of pressurized fluid therebetween, said cage being connected to one of said plunger and cylinder for movement therewith,
pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction,
main fluid control means for controlling the supply and discharge of said pressurized fluid to said space such that said cage is moved between a plurality of predetermined stop positions at respective spaced loading and unloading stations,
detecting means for detecting displacement of said cage in said first and second directions from respective stop positions of said cage,
cage position adjusting means responsive to signals from said detecting means which indicate displacement of said cage from the respective stop position for automatically returning said cage to said respective stop position by controlling the respective supply and discharge of pressurized fluid from said space,
said detecting means including: a first member operatively connected to said adjusting means for actuating said adjusting means in response to movement of said first member, a second member connected to said cage such that said second member is moved whenever said cage is moved, and clutch means for selectively coupling and uncoupling said first and second members to one another such that said first and second members move together when said clutch means is engaged and such that said second member and cage move independently of said first member when said clutch means is disengaged,
and clutch control means for engaging said clutch means only after said cage has arrived at a respective stop position for loading and unloading of said cage,
wherein said control means includes means for automatically engaging said clutch means after said cage has arrived at a respective stop position and before initiation of any loading or unloading of said cage and for automatically disengaging said clutch means after completion of any loading or unloading of said cage and before movement of said cage to another stop position, whereby said clutch is engaged only when said cage is in a condition for accommodating loading and unloading thereof such that said adjusting means is operative for accommodating changing loads on said cage, and wherein said first member is a rod extending along the travel path of the cage, and wherein said second member is a member carried by said cage.

28. An elevator according to claim 27, wherein said adjusting means includes an auxiliary fluid circuit for supplying pressurized fluid into said space independently of the operation of the main fluid control means, said auxiliary fluid circuit including:
an auxiliary conduit communicating with said space,
an auxiliary pump for supplying pressurized fluid to said auxiliary conduit,
and a check valve in said auxiliary conduit for preventing backflow of fluid to said auxiliary pump,
and wherein said auxiliary pump is operated in response to said signals from said detecting means for controlling the supply of pressurized fluid to said auxiliary conduit.

29. An elevator according to claim 28, further comprising a restriction in said auxiliary conduit intermediate said space and said control valve for attenuating abrupt changes in supply and discharge of said pressurized fluid to and from said space.

30. An elevator according to claim 28, wherein a further check valve and an accumulator are provided between the check valve and auxiliary pump, so that the pressurized oil discharged from the auxiliary pump may be accumulated in the accumulator and supplied at a predetermined pressure into said space when the cage has moved in said second direction from a respective stop position.

31. An elevator according to claim 1, wherein said control valve is movable between a position communicating said accumulator with said space and a position communicating said space with a reservoir for accepting discharged pressure fluid.

32. A fluid operated elevator comprising:
a load accomodating cage,
a plunger and a cylinder which are movable with respect to one another in response to supply of pressurized fluid therebetween, said cage being connected to one of said plunger and cylinder for movement therewith,
pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction,
main fluid control means for controlling the supply and discharge of said pressurized fluid to said space such that cage is moved between a plurality of predetermined stop positions at respective spaced loading and unloading stations, detecting means for detecting displacement of said cage in said first and second directions from respective stop positions of said cage,
and cage position adjusting means responsive to signals from said detecting means which indicate displacement of said cage from the respective stop position for automatically returning said cage to said respective stop position by controlling the respective supply and discharge of pressurized fluid from said space,
wherein said adjusting means includes an auxiliary fluid circuit for supplying pressurized fluid into said space independently of the operation of the main fluid control means, said auxiliary fluid circuit including:
an auxiliary conduit communicating with said space,
an auxiliary pump for supplying pressurized fluid to said auxiliary conduit,
a check valve in said auxiliary conduit for preventing backflow of fluid to said auxiliary pump,
a directional control valve for controlling the flow of pressurized fluid through said auxiliary conduit, and an accumulator interposed between said auxiliary pump and said control valve for accumulating a supply of pressurized fluid,
wherein said control valve is movable in response to said signals from said detecting means for controlling communication of said accumulator with said space,
and wherein said check valve is interposed in said auxiliary conduit between said auxiliary pump and said control valve, said auxiliary conduit including a pressure detector intermediate the check valve and control valve, said pressure detector including means for generating starting and stopping signals for said auxiliary pump as a function of the fluid pressure detector.

33. An elevator according to claim 32, wherein said pressure detector includes means for sending a stopping signal to the auxiliary pump when the detected fluid pressure is increased above a predetermined level and means for sending a stopping signal to the auxiliary pump when the detected fluid pressure drops below a predetermined level.

34. A fluid operated elevator comprising:
a load accomodating cage,
a plunger and a cylinder which are movable with respect to one another in response to supply of pressurized fluid therebetween, said cage being connected to one of said plunger and cylinder for movement therewith,
pressurized fluid conduit means communicating with a space between said cylinder and plunger for supplying said pressurized fluid to said space with a consequent movement of said cage in a first direction and for discharging said pressurized fluid from said space with a consequent movement of said cage in a second direction opposite said first direction,
main fluid control means for controlling the supply and discharge of said pressurized fluid to said space such that cage is moved between a plurality of predetermined stop positions at respective spaced loading and unloading stations, detecting means for detecting displacement of said cage in said first and second directions from respective stop positions of said cage, cage position adjusting means responsive to signals from said detecting means which indicate displacement of said cage from the respective stop position for automatically returning said cage to said respective stop position by controlling the respective supply and discharge of pressurized fluid from said space, said detecting means including: a first member operatively connected to said adjusting means for actuating said adjusting means in response to movement of said first member, a second member connected to said cages such that said second member is moved whenever said cage is moved and, clutch means for selectively coupling and uncoupling said first and second members to one another such that said first and second members move together when said clutch means is engaged and such that said second member and cage move independently of said first member when said clutch is disengaged, wherein said adjusting means includes an auxiliary fluid circuit for supplying pressurized fluid into said space independently of the operation of the main fluid control means, said auxiliary fluid circuit including:

an auxiliary conduit communicating with said space, an auxiliary pump for supplying pressurized fluid to said auxiliary conduit, and a check valve in said auxiliary conduit for preventing backflow of fluid to said auxiliary pump, wherein said auxiliary pump is operated in response to said signals from said detecting means for controlling the supply of pressurized fluid to said auxiliary conduit, wherein said second member is a pulley which is rotated by a connecting line means in response to displacement of said cage, and wherein said first member is a rotatable operating shaft provided with a cam, wherein said control valve is controlled directly by a solenoid, and wherein said cam is engageable with switch means which control energization of said solenoid such that when said clutch means is engaged, said operating shaft is rotated along with said pulley during displacement of said cage with a resultant control of said switch means by said cam and consequent movement of said control valve and adjustment of the cage position.

35. An elevator according to claim 34, wherein a restriction is provided in the auxiliary conduit between said control valve and said space.

36. An elevator according to claim 1, wherein a second check valve is interposed in said auxiliary fluid circuit between said control valve and said space, and wherein said second check valve is constructed as a pilot operated check valve which is controlled by a solenoid operated directional control valve other than said above-mentioned control valve, said second check valve being movable to a position permitting flow therethrough from said space to a discharge reservoir.

* * * * *